United States Patent
Perez et al.

(10) Patent No.: US 10,242,047 B2
(45) Date of Patent: Mar. 26, 2019

(54) SYSTEMS, METHODS, AND APPARATUSES FOR PERFORMING SEARCH QUERIES

(71) Applicant: FACEBOOK, INC., Menlo Park, CA (US)

(72) Inventors: Josue Perez, Santa Clara, CA (US); Tuhin Kumar, San Francisco, CA (US); Junfeng He, Fremont, CA (US); Ariel Benjamin Evnine, Oakland, CA (US); Christina Joan Sauper, San Francisco, CA (US); Zhongxian Chen, Fremont, CA (US); Christine Morck Rode, San Francisco, CA (US); Sadi Sufi Khan, Mountain View, CA (US); Kathryn Elizabeth Hymes, Mountain View, CA (US)

(73) Assignee: FACEBOOK, INC., Menlo Park, CA (US)

( * ) Notice: Subject to any disclaimer, the term of this patent is extended or adjusted under 35 U.S.C. 154(b) by 279 days.

(21) Appl. No.: 14/547,901

(22) Filed: Nov. 19, 2014

(65) Prior Publication Data
US 2016/0140167 A1 May 19, 2016

(51) Int. Cl.
G06F 17/30 (2006.01)
H04L 29/06 (2006.01)
H04L 29/08 (2006.01)

(52) U.S. Cl.
CPC .. *G06F 17/30424* (2013.01); *G06F 17/30554* (2013.01); *H04L 65/4084* (2013.01); *H04L 67/306* (2013.01)

(58) Field of Classification Search
CPC ......... G06F 17/30424; G06F 17/30554; H04L 65/403; H04L 67/306
See application file for complete search history.

(56) References Cited

U.S. PATENT DOCUMENTS

| | | | | |
|---|---|---|---|---|
| 2010/0146118 | A1* | 6/2010 | Wie | H04L 67/306 709/225 |
| 2011/0010378 | A1* | 1/2011 | Dukes | G06F 17/30554 707/759 |
| 2012/0246578 | A1* | 9/2012 | Baldwin | G06Q 50/01 715/753 |
| 2013/0117284 | A1* | 5/2013 | Roozen | G06Q 10/10 707/748 |
| 2013/0212081 | A1* | 8/2013 | Shenoy | G06F 17/30864 707/706 |
| 2013/0275164 | A1* | 10/2013 | Gruber | G10L 17/22 705/5 |

(Continued)

OTHER PUBLICATIONS

U.S. Appl. No. 61/922,597, filed Dec. 31, 2013. (Year: 2013).*

*Primary Examiner* — Jay A Morrison
(74) *Attorney, Agent, or Firm* — Keller Jolley Preece (57) ABSTRACT

Exemplary methods, apparatuses, and systems for processing a search query of a user are detailed. For example, a search query may be received from a user at a social networking system, processed to generate a search result of a plurality of entity result cards and each result card that each include a plurality of order comments about the entity, a plurality of ordered images associated with the entity, contact information for the entity, wherein the comments and images take into account information about the user stored at the social networking system, and a result send to the user.

20 Claims, 6 Drawing Sheets

(56) References Cited

U.S. PATENT DOCUMENTS

| | | | | |
|---|---|---|---|---|
| 2014/0126826 A1* | 5/2014 | Yabu | G06Q 30/06 382/190 |
| 2014/0172892 A1* | 6/2014 | Schechter | G06F 17/30386 707/758 |
| 2014/0188925 A1* | 7/2014 | Skolicki | H04N 21/4622 707/765 |
| 2014/0270407 A1* | 9/2014 | Balakrishnan | G06F 17/30256 382/118 |
| 2014/0324828 A1* | 10/2014 | Hanses | G06F 17/30613 707/722 |
| 2014/0324829 A1* | 10/2014 | Hanses | G06F 17/30613 707/722 |
| 2015/0103097 A1* | 4/2015 | Li | G06F 17/30268 345/633 |
| 2015/0186538 A1* | 7/2015 | Yan | G06F 17/30268 707/722 |
| 2015/0339405 A1* | 11/2015 | Vora | G06F 17/30864 707/706 |
| 2015/0356126 A1* | 12/2015 | Kasravi | G06Q 10/10 707/743 |
| 2016/0062616 A1* | 3/2016 | Lee | G06F 3/04845 715/766 |
| 2016/0078133 A1* | 3/2016 | Santhanam | G06F 17/30991 707/734 |

* cited by examiner

SYSTEMS, METHODS, AND APPARATUSES FOR PERFORMING SEARCH QUERIES

FIELD

The various embodiments described herein relate to performing search queries. In particular, the embodiments relate to search queries for a social networking system.

BACKGROUND

Social networking systems enable users to interact with various objects represented within the social network. For example, a social networking system allows users to designate other users or entities as connections (or otherwise connect to, or form relationships with, other users or entities), contribute and interact with their connections, post media or commentary, share links to external content, use applications, join groups, list and confirm attendance at events, invite connections, and perform other tasks that facilitate social interaction. External applications also use the services of a social networking system to allow authenticated users to incorporate some of the above social interactions with use of the external applications. Similar interactions may also be a part of the user experience within other network services.

SUMMARY OF THE DESCRIPTION

Exemplary methods, apparatuses, and systems for performing and providing functionality for search queries in the context of a social networking system. Detailed herein is a description, for example, of a user interface that allows a user to submit a directed search query to the social networking system which then provides a result as one or more result cards regarding a topic/entity. These cards include images, comments, etc. about the topic/entity that are presumably relevant to the user's needs.

The search query may be subjected to one or more constraints that affect the provided result cards. For example, the user may constrain the results to topic type, location, social interaction, time, and/or visited by.

The user interface may also provide a map of relevant search results with indications of where the entity/topic of the result cards are located.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

While there are many approaches to providing online recommendations or information about different types of places, activities, etc., these approaches do not adequately address the reliability of the provided content or take into account the recipient of the information other than what was provided in the request. For example, an existing online recommendation website that provides a result for restaurants in a particular area merely provides a listing of restaurants that fit that search query in an order of highest rated to lowest rated. Detailed herein are embodiments of systems, methods, and apparatuses for providing recommendations that take into account not only a search query, but also characteristics of the user that has made the query (subject to privacy policies).

In the following description, numerous specific details are set forth. However, it is understood that embodiments of the invention may be practiced without these specific details. While a social networking system is used to describe embodiments of preview generation for online content, it will be understood that these concepts are generally applicable to generating previews for online content for other network services/entities, websites, etc. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
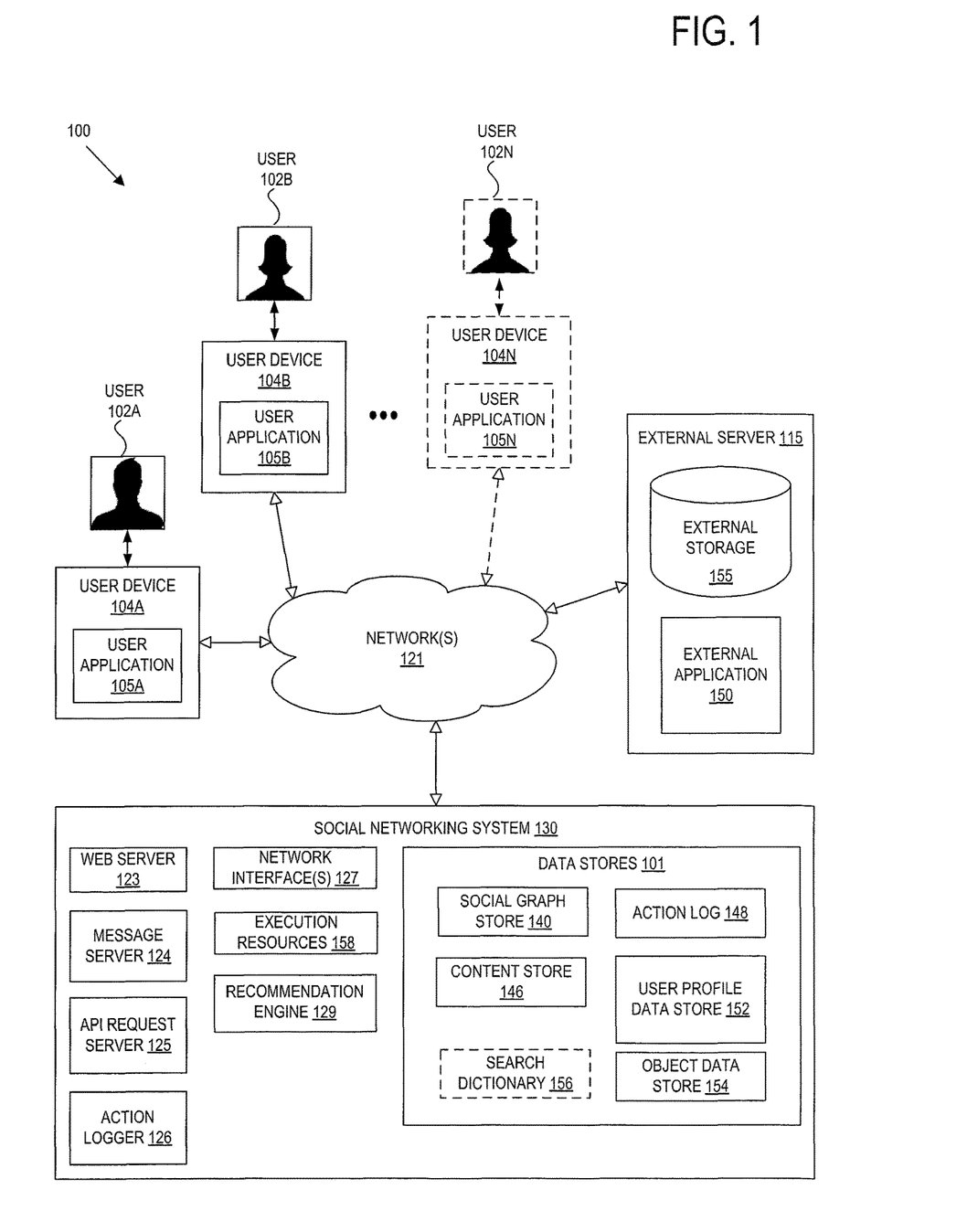
FIG. 1 illustrates an example network environment of a system 100 including a social networking system.

FIG. 1 illustrates an example network environment of a system 100 including a social networking system 130 that offers its users 102A-102N the ability to communicate and interact with other users 102A-102N and entities of the social networking system 130 according to an embodiment of the invention.

In some embodiments, the social networking system 130 comprises one or more computing devices storing user profiles associated with users 102A-102N and/or other objects, as well as connections between users and other users 102A-102N and/or objects.

The user devices 104A-104N that are enabled to interact with social networking system 130 can be any type of computing device capable of receiving user input as well as transmitting and/or receiving data via a network (e.g., network 121). For example, the user devices 104A-104N can include conventional computer systems, such as a desktop or laptop computer, or may include devices having computer functionalities such as Personal Digital Assistants (PDA), cellular or mobile telephones, smart-phones, in- or out-of-car navigation systems, gaming devices, or other electronic devices.

In one embodiment, a user device (e.g. 104A) may execute a user application (e.g. 105A) allowing a user 102A of the user device 104A to interact with the social networking system 130. For example, the user application 105A may be a web browser application (e.g., Microsoft Windows Internet Explorer, Mozilla Firefox, Apple Safari, Google Chrome, Opera, etc.). In an embodiment, the user application 105A is a special-purpose client application (e.g., Facebook for iPhone or iPad, etc.), and in an embodiment the user application 105A is the native operating system of the user device 104A, such as Windows®, Mac OSX®, IOS®, or ANDROID™, which may utilize an Application Programming Interface (API) to directly interface with the social networking system 130 through API request server 125.

The user devices 104A-104N are configured to communicate with the social networking system 130 via a network 121 or collection of networks—such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network 121 may be wired, wireless, or a combination of both. In one embodiment, the network 121 uses standard communications technologies and/or protocols. Thus, the network 121 may include links using technologies such as Ethernet, Institute of Electrical and Electronics Engineers (IEEE) 802.11, Worldwide Interoperability for Microwave Access (WiMAX), 3G, 4G, Long Term Evolution (LTE), Code-Division Multiple Access (CDMA), Digital Subscriber Line (DSL), cable modems, etc. Similarly, the networking protocols used on the network 121 may include Multiprotocol Label Switching (MPLS), Transmission Control Protocol (TCP), Internet Protocol (IP), TCP/IP, User Datagram Protocol (UDP), Hypertext Transport Protocol (HTTP), Simple Mail Transfer Protocol (SMTP), and/or File Transfer Protocol (FTP). Data exchanged over the network 121 may be represented using technologies and/or formats including Hypertext Markup Language (HTML), Extensible Markup Language (XML), or JavaScript Object Notation (JSON), among other formats. In addition, all or some of links can be encrypted using conventional encryption technologies such as Secure Sockets Layer (SSL), Transport Layer Security (TLS), or Internet Protocol security (IPsec).

The social networking system 130 fundamentally relies upon information representing its users 102A-102N and a set of objects. Users 102A-102N, using the social networking system 130, may add connections to other users or objects of the social networking system 130 to which they desire to be connected, and may also interact with these other users or objects. The users of the social networking system 130 are individuals (e.g. humans), and the objects may include entities (such as businesses, organizations, universities, manufacturers, brands, celebrities, etc.), concepts, or other non-human things including but not limited to a location, an album, an article, a book, a concept, etc.

In some embodiments, the social networking system 130 also allows users to interact with external (e.g., third-party) applications 150 (e.g., websites), external storage 155, and/or external servers 115 (e.g., server end stations).

Based on the stored data about users, objects, and the connections between the users and/or objects, the social networking system 130 generates and maintains a "social graph" in a social graph store 140 comprising a plurality of nodes interconnected by a plurality of edges. Each node in the social graph represents a user or object that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 130 adds, removes, or otherwise modifies edges connecting the various nodes to reflect the interactions.

To provide these functionalities, the embodiment of the social networking system 130 includes an API request server 125, a web server 123, a message server 124, an action logger 126, and a set of data stores 101. This embodiment also includes, within the data stores 101, a social graph store 140 including a node store 142 and an edge store 144, as well as a content store 146, an action log 148, a user profile data store 152, and an object data store 154. In other embodiments, the social networking system 130 may include additional, fewer, or different modules for various applications. Of course, conventional components such as processors, memories, security mechanisms, load balancers, failover servers, management and network operations consoles, and the like are not shown in FIG. 1 so as to not obscure the details of the system.

The social networking system 130 allows its users 102A-102N to communicate or otherwise interact with each other and access content, as described herein. The social networking system 130 stores user profiles in the user profile data store 152. A user profile includes declarative information about the user that was explicitly shared by the user, and may also include profile information inferred by the social networking system 130. In one embodiment, a user profile includes multiple data fields, each data field describing one or more attributes of the corresponding user of the social networking system 130. The user profile information stored in user profile data store 152 describes the users 102A-102N of the social networking system 130, including biographic, demographic, and other types of descriptive information, such as work experience, educational history, gender, relationship status, hobbies, location, other preferences, and the like. The user profile may also store information provided by the user. For example, images or videos provided by the user may also be stored within the user profile. In other embodiments only textual data of the user is stored in the user profile and other data (e.g., images, videos) are stored in multimedia stores and associated with the user (e.g., through associating a user identifier of the user with an image/video identifier of the multimedia content). In certain embodiments, images or videos including or depicting users of the social networking system 130 may be "tagged" with identification information of those users. A user profile in the user profile data store 152 may also maintain references to actions (stored in the user profile or in an action log 148) by the corresponding user performed on content items in a content store 146 and stored in an edge store 144. A user may also specify one or more privacy settings, which are stored in that user's user profile. Privacy settings limit information that the social networking system 130 or other users of the social networking system 130 are permitted to access from that user's user profile.

The web server 123 links the social networking system 130 via the network 121 to one or more user devices 104A-104N by accepting requests for from the user devices 104A-104N and/or transmitting web pages or other web-related content to the user devices 104A-104N, such as image files, audio files, video files, Java applets, Flash, XML, JavaScript, Cascading Style Sheets (CSS), and so forth. The web server 123 in some embodiments is configured to utilize a set of one or more network interfaces 127 to send and receive messages across the network 121. In some embodiments the web server 123 (additionally or alternately) utilizes a message server 124 (e.g., a dedicated server end station, a dedicated software application, etc.) to communicate with the user devices 104A-104N, which is operative to send and/or receive instant messages, queued messages (e.g., email), text and SMS (Short Message Service) messages, or utilize any other suitable messaging technique.

In some embodiments, a message sent by a user to another user by way of the social networking system 130 can be viewed by other users of the social networking system 130, for example, by certain connections of the user (directly connected users in the social graph, other users more than one hop away in the social graph, etc.) receiving the message. An example of a type of message that can be viewed by other users of the social networking system 130 (besides the recipient of the message) is commonly known as a wall post. In some embodiments, a user can send a private message to another user that can only be retrieved by the other user.

When a user takes an action within the social networking system 130, the action may be recorded in an action log 148 by an action logger 126, subject to any privacy settings and restrictions of the user and/or social networking system 130. In one embodiment, the social networking system 130 maintains the action log 148 as a database of entries. When an action is taken on the social networking system 130, the social networking system 130 can add an entry for that action to the action log 148. In accordance with various embodiments, the action logger 126 is capable of receiving communications from the web server 123 about user actions on and/or off the social networking system 130. The action logger 126 populates the action log 148 with information about those user actions. This information may be subject to privacy settings associated with the user. Any action that a particular user takes with respect to another user is associated with each user's profile, through information maintained in a database or other data repository, such as the action log 148. Examples of actions taken in the social networking system 130 that may be stored in the action log 148 include, but are not limited to, adding a connection to another other user, sending a message to the other user, reading a message from the other user, viewing content (e.g., wall posts, images, videos) associated with or created by the other user, attending an event posted by another user, being tagged in photos with another user, etc. In some embodiments, certain actions are described in connection with more than one user, and these actions may be associated with those users as well and stored in the action log 148.

The action log 148 may be used by the social networking system 130 to track other user actions on the social networking system 130, as well as actions on an external application 150 (e.g., website) that are communicated to the social networking system 130. Users may interact with various objects on the social networking system 130, including commenting on posts, sharing links, and checking-in to physical locations via a mobile device, accessing content items in a sequence or other interactions. Information describing these actions is stored in the action log 148. Additional examples of interactions with objects on the social networking system 130 included in the action log 148 include logging in to the social networking system 130, commenting on a photo album, communications between users, becoming a fan of a musician or brand by "liking" a page of the respective entity, adding an event to a calendar, joining a group, creating an event, authorizing an application, using an application, and engaging in a transaction. Additionally, the action log 148 records a user's interactions with advertisements on the social networking system 130 as well as other applications operating on the social networking system 130. In some embodiments, data from the action log 148 is used to infer interests or preferences of the user, augmenting the interests included in the user profile and allowing a more complete understanding of user preferences.

The API request server 125 allows external systems (e.g., an external application 150 of external server 115, and/or user applications 105A of user devices 104A-104N) to access information from or transmit information to the social networking system 130 by issuing API calls. The information provided by the social networking system 130 may include user profile information or the connection information of users, subject to the individual privacy settings of the user. For example, a system (e.g. external application 150) may send an API request to the social networking system 130 via the network 121 to publish a story on behalf of a user, request information about a user (after having been given permission to do so by the user), upload a photograph on behalf of a user, etc. API requests are received at the social networking system 130 by the API request server 125, which then processes the request by performing actions sought by the API requests, determining appropriate responses to the API requests, and transmitting back these responses back to the requesting application 150 via the network 121.

The content store 146 stores content items associated with user profiles, such as images, videos, and/or audio files. Content items from the content store 146 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users or entities, to invite new users to the system or to increase interaction with the social network system 130 by displaying content related to users, objects, activities, or functionalities of the social networking system 130. Examples of social networking content items include suggested connections or suggestions to perform other actions, media provided to or maintained by the social networking system 130 (e.g., pictures, videos), status messages or links posted by users to the social networking system, events, groups, pages (e.g., representing an organization or commercial entity), and any other content provided by, or accessible via, the social networking system 130.

The content store 146 also includes one or more pages associated with entities included social graph store 140. An entity is a type of object that can be a non-individual user of the social networking system 130, such as a business, a vendor, an organization, or a university. However, in some embodiments of the invention, an entity may represent a celebrity or other well-known individual, and thus an entity object node for a person may exist in the social graph (serving as a "brand" for that individual, and perhaps having an associated page that other users may "like") and also a user node for that same person may also exist in the social graph (serving as a representation for a personal account of that person). A page includes content associated with an entity and instructions for presenting the content to a user of the social networking system 130. For example, a page identifies content associated with the entity's stored content (from the object data store 154) as well as information describing how to present the content to users viewing the page.

In the depicted embodiment, the social networking system 130 includes a recommendation engine 129. Typically, this recommendation engine 129 is a program stored in memory and executed by a processor (execution resources 158) of the social networking system to execute a search query on behalf of a user of the social network and return a result. For example, a user device 104B will call on the recommendation engine 129 to execute and return a search query. In some embodiments, the recommendation engine 129 accesses one or more of a search dictionary 156 that stores search terms (e.g., restaurant types, food categories, music types, etc.), a social graph store 140, a user profile data store 152, a content store 146, and an object data store 154. For example, the recommendation engine 129 may execute a user's query by looking at the user's connections in the social graph store 140, the user's profile in the user profile data store 152, pictures associated with particular entities, etc. stored in content store 146, and information about an entity in object data store 154 (such as food served, etc.). In some embodiments, the search dictionary 156 provides an underlying topic that is a part of the query such as a restaurant, park, museum, event, etc.

Figure 2:
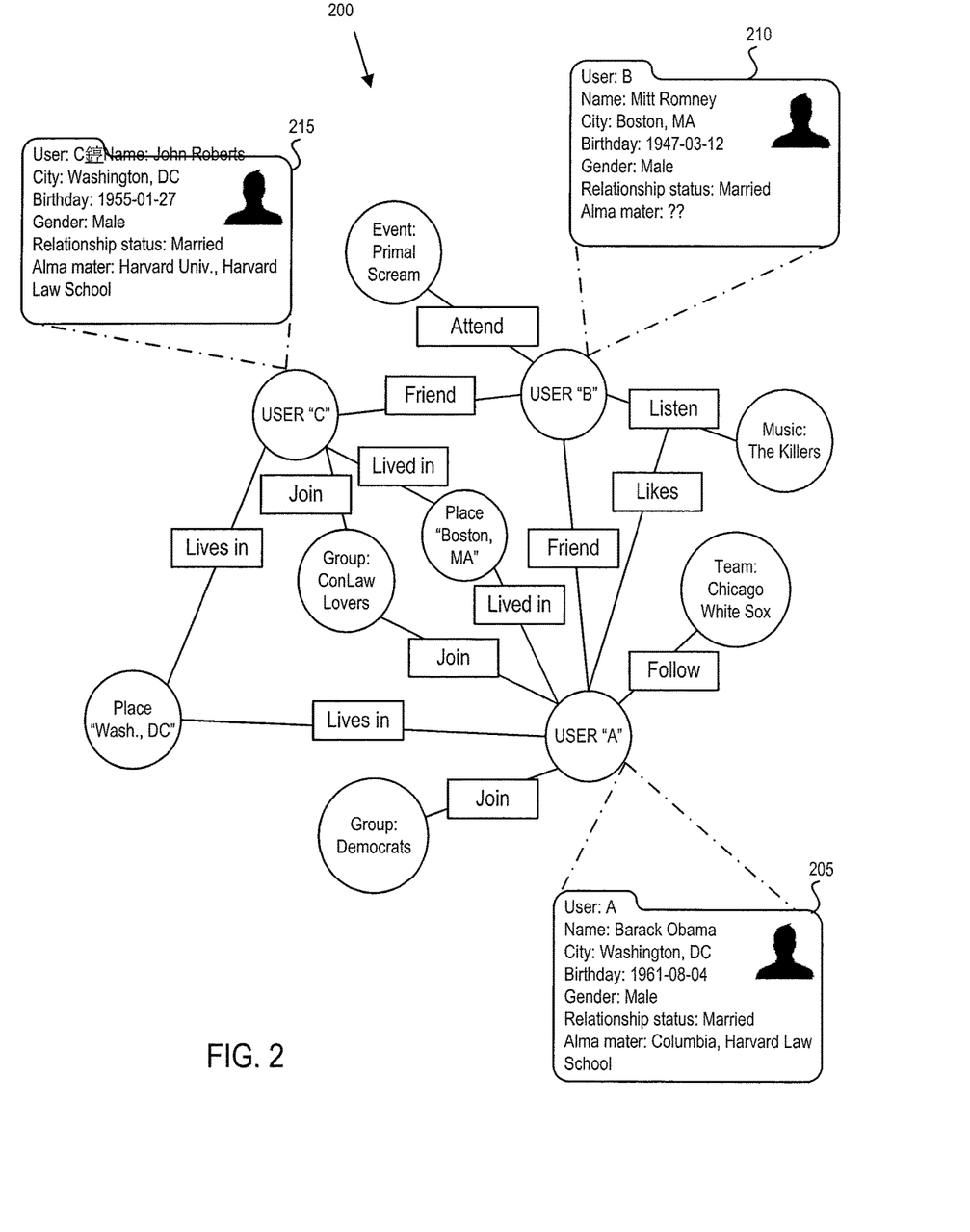
FIG. 2 illustrates exemplary graph 200 of social network data.

FIG. 2 illustrates exemplary graph 200 of social network data. In graph 200, objects are illustrated as circles and actions are illustrated as labeled connections between circles. Developers of the social network or corresponding social network applications define actions to represent different ways that users may interact with the social network and/or their applications. As users perform actions, connections are made between users and objects. For example, User A has performed a number of actions within the social network, indicating that he previously lived in Boston, currently lives in Washington D.C., joined groups for Democrats and ConLaw Lovers, is following the White Sox, and is friends with User B. User B and User C have also performed a number of actions with respect to objects within graph 200.

In one embodiment, users are able to add demographic information to user profiles 205-215. In one embodiment, for demographic information that has not been entered by a user, a social network application generates an estimate based upon the user's actions, connections, and/or actions of connections. For example, User B has not entered an alma mater into user profile 210. A social network application may determine from User B's contacts, activities, cities of residence, etc. that User B's likely alma mater is one or both of Brigham Young University and Harvard University. In one embodiment, the user profiles 205-210 include additional information, such as relationships to other users, places where the user has worked, user interests, etc.

In one embodiment, users are able to provide feedback on actions of other users/entities. As a result, actions are also viewed as objects that may be acted upon. For example, User B listened to music by the artist, The Killers. As a result, the social networking system publishes a narrative associated with User B (e.g., in a newsfeed, profile of User B, etc.) indicating that User B listened to music by the artist, The Killers. In viewing a newsfeed, profile of User B, or another form of social networking system publication(s), the social networking system displays the narrative to User A. The social networking system then receives input from User A indicating that User A "likes" that User B listened to The Killers.

In one embodiment, demographic data further includes a weight or score indicating an affinity between a user and an object. For example, repeated user action with one object may indicate a stronger affinity for said object than another object with which the user has limited interaction. First degree connections, e.g., the friendship between User A and User B, may indicate a stronger affinity than second degree connections, e.g., User A is friends with User B, who is friends with User C, creating a second degree connection between User A and User C. An indication that two users are married may indicate a stronger affinity than if two users are friends. Additionally, temporal and geographic proximity of actions/users are other exemplary indicators of affinity.

In one embodiment, users may select privacy settings to control what network service data is shared, with whom the data is shared, and/or what data used for selecting candidate objects.

Figure 3:
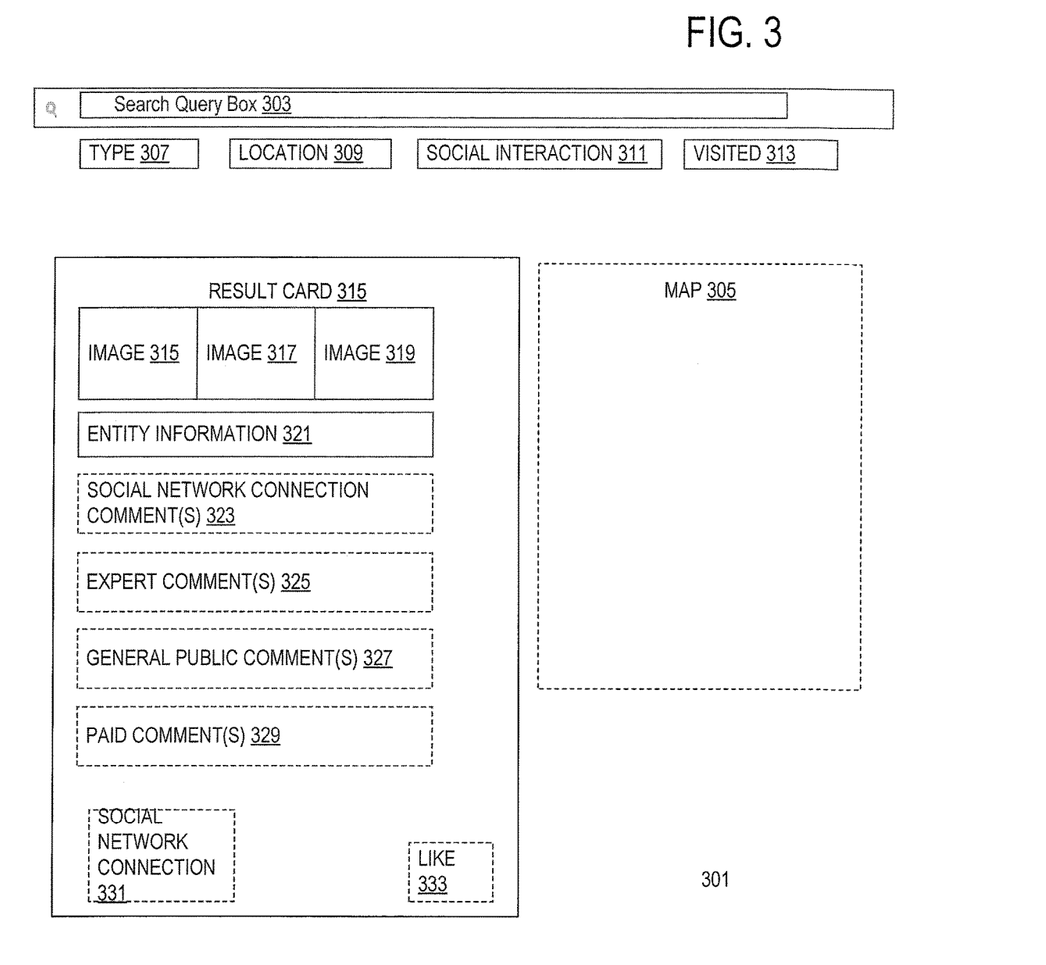
FIG. 3 illustrates an exemplary user interface for a search query and its result(s) according to an embodiment.

FIG. 3 illustrates an exemplary user interface for a search query and its result(s) according to an embodiment. This interface 301 is provided to a user from the social networking system (such as described in FIG. 1) for the user to request a search to be performed by the social network using a user device. This user interface is transmitted from the social network to a client for rendering. In some embodiments, this user interface is provided by the recommendation engine 129.

A search query box 303 to allow a user to request a search is provided in the user interface. A user inputs a search query string into this box 303 and the content of this string is received by the social networking system for processing (for example, by the recommendation engine 129). The search query itself may be subjected to one or more constraints, including but not limited to: 1) place/topic type 307; 2) location 309; 3) social interaction 311; and 4) visited by 313. The place/topic type 307 allows the user to narrow the search by a variety of available topics. Exemplary topics 307 include park, restaurant, bar, café, landmark, events, etc. These topics may be stored in a dictionary as detailed earlier. Location constraint 309 allows the user to specify the location that the results are to be limited to. For example, the location may be as simple as "nearby" wherein the social networking service determines the radius from the user's location. Other location constraints include, but are not limited to, city names, zip codes, addresses, countries, etc. Social interaction constraint 311 allows the user to specify interactions with the entity that are important. For example, is the entity liked/followed by anyone, the user, the user's friends, etc.; is the entity rated by others on the social network, etc. Finally, the visited by constraint 313 allows the searching user to constrain the search to who has previously visited the entity or is at an event. Visits may be tracked by check-ins, posts, likes, and/or other social signals. Additionally, in some embodiments, a search content may be refined by current location users. For example, a searching user can refine a search to show where their friends are or where the most users of the social networking system are presently.

In some embodiments, a search query includes a string to denote that the search is for a nearby entity. For example, the if a user were to search for nearby restaurants that serve burritos the string may be "nearby:burritos" where the word nearby denotes that this is a search to find a local entity. Of course, this is merely an exemplary string and other forms may be used. There are many different ways to determine the user's location for the search query including, but are not limited to, HTML5 geolocation, GPS coordinates, IP address mapping, WiFi coordinates, cell tower coordinates, or user defined.

In addition to more traditional locations/entities such as parks, restaurants, etc., in some embodiments a user may search for more contemporaneous things such as events that are ongoing or are planned in the future. For example, a user may search for "nearby:events" to get a listing of events that are currently going on such as movies, concerts, etc. In some embodiments, the user may further constrain events to a time period such as a particular date, within a time frame, etc. For ongoing events, social networking activities such check-ins, postings, etc. are typically given more weight in the search. In the discussion herein, descriptions of entities is applicable to events. For example, a user may constrain a search of nearby restaurants to only look at ratings from the past 30 days.

In other embodiments, the search includes a string to denote that the search is for an entity that does not factor in location. For example, if a user were to search for the category of "rock music" the string may be "category:rock music" where the word category denotes that this is a category search.

The user interface 301 includes one or more results. In this particular example, each result is an entity result card 315 that includes content associated with the resulting entity. A result card 315 may include one or more of the following: 1) photos taken at a location (geotagging, metadata, post content, etc. may be used to determine that the location of a photo is associated with the entity) and/or on a page of an entity (for example, photos shared by a business on their page); 2) a rating of the entity; 3) entity name and contact information; and 4) comments about the entity.

Typically, a result card includes one or more images 315-19 associated with the entity. These images 315-19 may come from users of the social networking system (they are associated with these users' profiles), the entity itself, from webpages on the Internet, etc. The images 315-19 that are chosen and their order may take into account several factors. In some embodiments, images with stronger social signals such as friends are tagged in the images are given higher priority, whereas images that show people that are not connected are given lower priority. Priority in the context of this description means that something appears first or on top. In some embodiments, images of what the entity is known for are given a higher priority. For example, if a restaurant is known for burritos then a photo a burrito at the restaurant is given higher priority over a picture of chips and salsa. In some embodiments, the number of views of the image is used as a factor. For example, an image that has been viewed hundreds of times on the social network will get a higher priority than an image that has only been seen by a few people. In some embodiments, recency of an image is a factor. For example, more recent photos would be given higher priority than older photos. Additionally, the category of entity may influence what photo is chosen. For example, outside photos are typically used for parks and photos of food are typically used for restaurants.

Images in a result card 315 are typically thumbnails of a larger resolution image that is accessible to the user by clicking on the thumbnail. In some embodiments, images associated with an entity are a part of a collection that is accessible by user interaction with any one of the displayed images/thumbnails. The images may be stored by the social networking system or by a third-party.

Typical results 315 also include entity information 321 such as contact information for the entity (address, phone number, website, etc.). This information may be stored as a part of an entity object such as a profile for the entity on the social networking service. There may also be a rating in this information 321. Depending upon the implementation, the entity's rating is calculated based on one or more components: users of the social networking system that have ranked it; social connections that have ranked it; users of the social networking system that fit in the searching user's demographic; expert ratings; and third-party ratings. Additionally, in some embodiments, rating components may be weighted. For example, ratings by social connections may be given a higher weight than third-party ratings. The rating may be star, numerical, letter, etc. based.

Results 315 may also include one or more comments about the entity such as social network connection comment(s) 323, expert comment(s) 325, general public comment(s) 327, and paid comment(s) 329. Social network connection comment(s) 323 are those that a connection (direct or indirect) to the searching user has made with respect to the entity. For example, a social networking friend's (or a friend of a friend's) post about the entity is one such comment. Expert comment(s) 325 are those comments that come from a more authoritative source on that topic. For example, comments from a food critic would be expert comment(s) about a restaurant. General public comment(s) 327 are those that come from non-connected users of the social network and/or other forums such as review websites, etc. Paid comment(s) 329 are those that are promoted by the resulting entity. Examples of paid comments include promotions, statements regarding awards, etc. Which comments are shown and their order is subject to signals. For example, friend comments, keywords the entity is known for, number of views, formal (expert) reviews, etc. are typically given higher priority than general comments. Additionally, these signals may be weighted.

In some embodiments, some comments are not shown in there entirety, but snippets (a portion of a comment) are shown instead. For example, words that are interesting to the entity or search query are highlighted. For example, a search for "tacos nearby" will have "tacos" highlighted. In some embodiments, posts are reviewed to find a most unique aspect of the entity and this aspect is shown as a snippet. For example, a particular menu item may be highlighted by a snippet. In some embodiments, a snippet is tied to an image provided.

In some embodiments, comments are not allowed to be anonymous. In these embodiments, a name, picture, etc. of the reviewer is shown with the comment.

In some embodiments, comments are quality reviewed by the social networking system based on one or more of length, language, recency, etc. Short comments without much comment may not be given as much weight as longer, more substantial reviews. Comments in a language not understood by the searching user are also typically not of desirable quality. Excessive explicit language or use of capitalization may also signal a poor comment.

The order of results 315 may take into account several different factors. For example, in some embodiments, the results are ordered by proximity to the user's location. In some embodiments, nearby entities that the searching user has been to before (checked-in, etc.) are not shown so that the user is provided with new places to try. Trending entities may also be given higher priority in some embodiments.

Each of the components of a result 315 may be a link to underlying social networking data and/or to external sources. For example, an image may be a link to a saved user image or to an image saved at the social networking service or an external site.

In some embodiments the result 315 includes a link to one or more social networking connections 331 if available. These social networking connections have either been to the location or commented on it. Additionally, there may be a means for liking 333 or other social action for an entity.

Once liked, an entity is typically added to a collection of entities associated with the user.

In some environments, for example in mobile environments, comments, entity information, etc. are overlaid on top of images and thereby conserving space. In these environments, clicking on the card can bring up more detail.

If a map 305 is included in a search interface, pins are typically placed where the resulting entities are located. In embodiments that allow a user to search for people, pins for their social connections may be placed on the map. Additionally, an indication of a number of people at a particular location may be shown (for example, through the use of different colored pins). In some embodiments, the map 305 is interactive and a user can change the map location and/or size to cause a revised result listing to appear.

Figure 4:
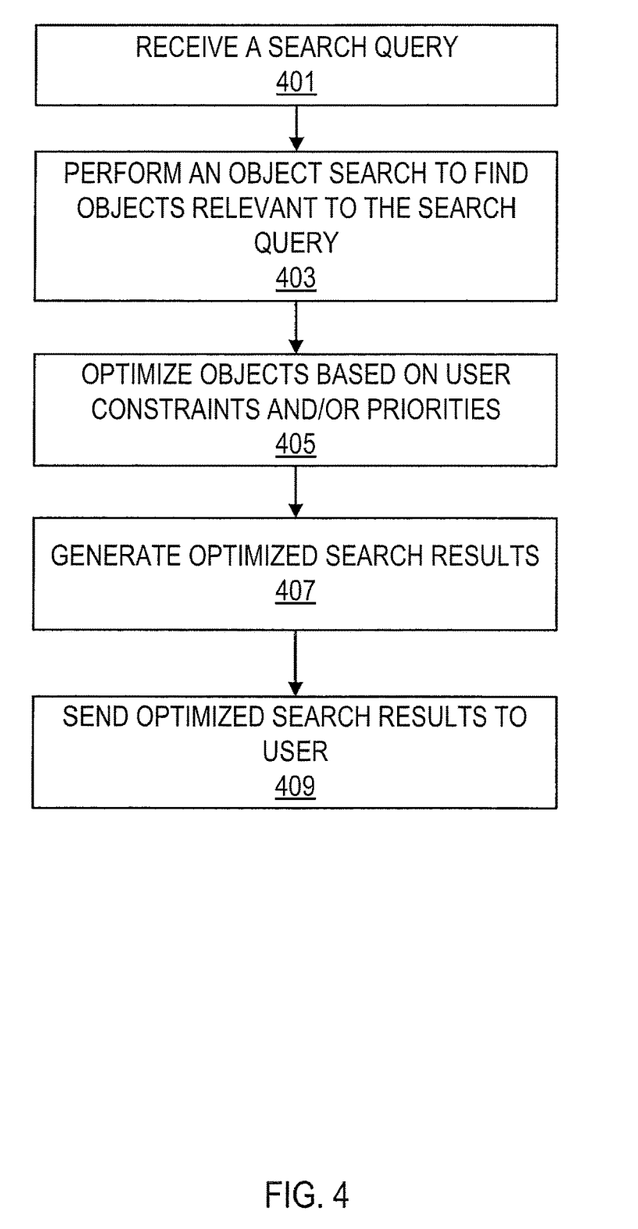
FIG. 4 illustrates a method for performing a search using a social networking system according to an embodiment.

FIG. 4 illustrates a method for performing a search using a social networking system according to an embodiment. For example, the recommendation engine 129 of the social networking system may provide the functionality detailed herein (e.g., code to be executed on a processor). At 401, a search query is received from a user of the social networking system. This search query includes a string regarding a topic that the user wants more information about. For example, in the embodiment of FIG. 1, a user, through a user device, sends a search query through network 121 to be received by the social networking system 130 which then begins processing the query using recommendation engine 129. In some embodiments, the search query includes a string to denote a nearby search. In some embodiments, the search query includes not only strings of text, but is also further limited by one or more constraints as detailed earlier. These constraints may be included as text from the user, or may be selected by the user using a user interface of the social networking system. In some embodiments, constraints are not applied until after a search result has been sent to the user.

At 403, an object search is performed by the social networking service (for example, using the recommendation engine 129 based on the search query to find objects that are relevant to the creation of a result. As noted above, content of the social networking system such as entity pages, images, etc. are objects. The social networking service may evaluate one or more of a search dictionary 156 that stores search terms (e.g., restaurant types, food categories, music types, etc.), social graph store 140, user profile data store 152, content store 146, and object data store 154 to retrieve objects for a search result. For example, the recommendation engine 129 may look at the content store for images associated with an entity of the object data store, etc. and pull those items (or at least a reference to those items) for use in a result.

Once objects of a result have been retrieved by the search of 403, the results of the search are optimized based on user defined constraints and/or priorities as detailed above at 405. For example, the selection of images may be optimized at this point. Typically, this optimization uses weighted rankings to determine object selection and order.

One or more optimized search results are generated at 407. These results are in the form described earlier and include several different aspects such as those found in a result card. Additionally, in some embodiments, if the search was a location based search then a map is also generated.

The generated optimized search results are then sent to the user at 409 for rendering by the user's device. For example, the social networking service sends a page to a user device to display the above described user interface. In some embodiments, the user can use the constraints and/or map to refocus the search result.

Figure 5:
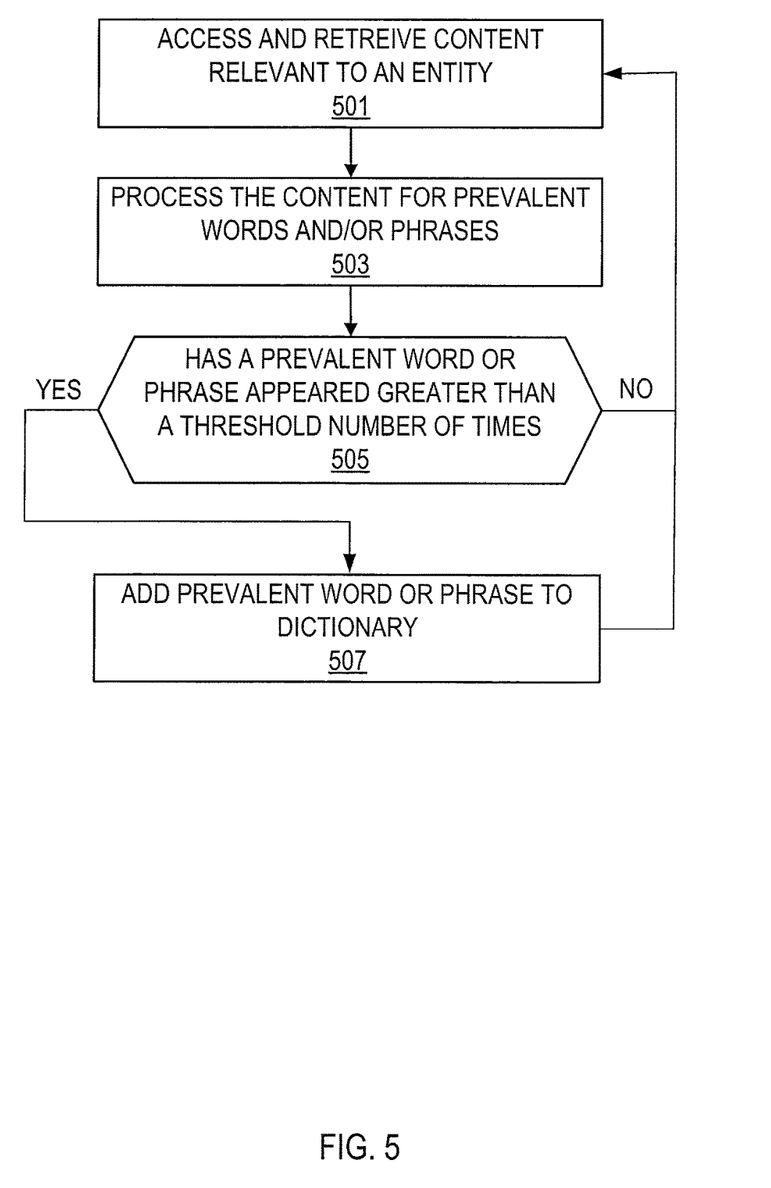
FIG. 5 illustrates an embodiment of a method for topic dictionary management.

FIG. 5 illustrates an embodiment of a method for topic dictionary management. Embodiments of this method are performed by the social networking system (e.g., as code executed on a processor), however, a third party may also supply topics and/or a topic dictionary from prevalent words and/or phrases.

At 501, content relevant to an entity is accessed and retrieved. For example, a webpage of a local restaurant is accessed and images and text (such as a menu, accolades, etc.) from that webpage are retrieved. The images may include metadata that may provide topics and/or image recognition may be used to identify an aspect. Sources of data that are not directly tied to the entity may also be accessed. For example, third party review sites may be accessed and their content retrieved.

At 503, the retrieved content is processed to find prevalent words and/or phrases regarding that entity. For example, the content is analyzed to see what words are used more than a threshold number of times. In some embodiments, social networking content is also processed at 503 to find prevalent words and/or phrases. For example, posts about an entity are analyzed.

At 505, a determination of if a word or phrase has appeared more than a threshold number of times for a threshold plurality of entities is made. For example, has the word or phrase been used greater than X number of times in association with Y entities?

If yes, then the prevalent word or phrase is added to the dictionary of categories at 507. If not, then the social networking system continues to search for terms relevant to entities.

Figure 6:
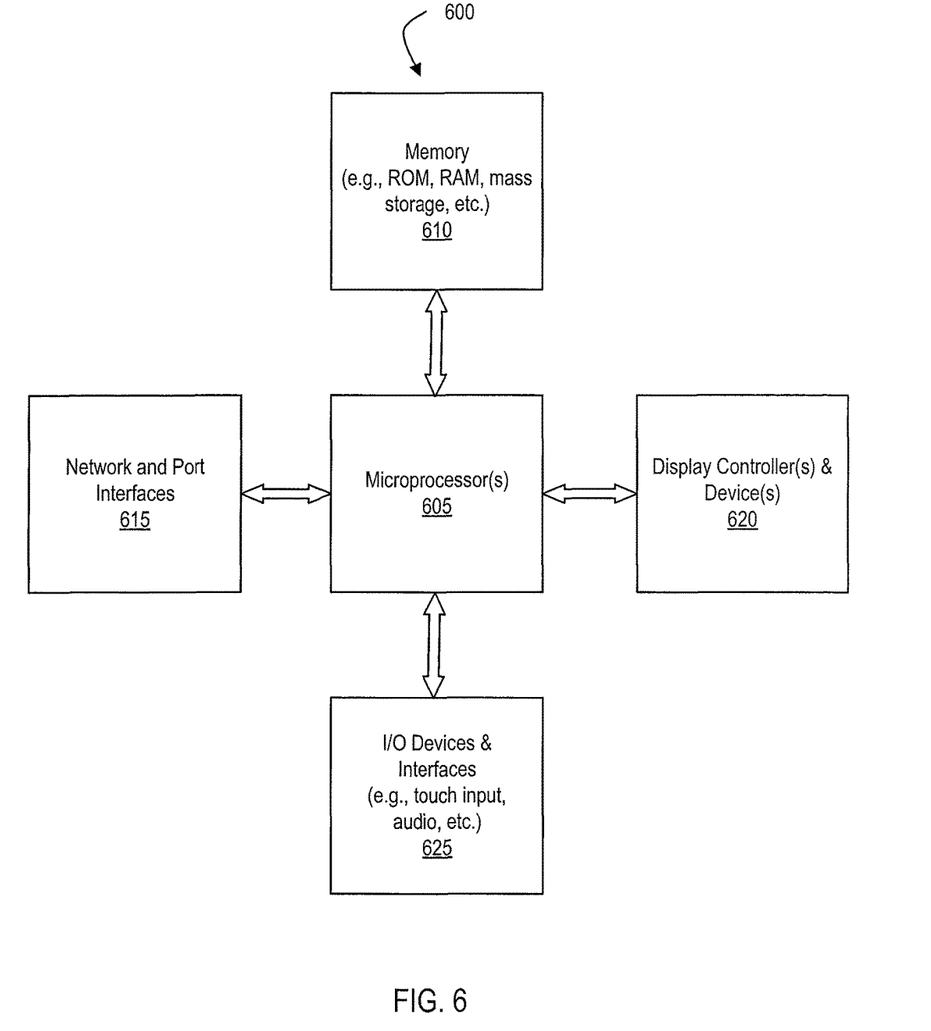
FIG. 6 illustrates, in block diagram form, an exemplary processing system 600 to perform search queries.

FIG. 6 illustrates, in block diagram form, an exemplary processing system 600 to perform search queries. In some embodiments, this is a high-level view of social networking system 1130 described herein. Data processing system 600 includes one or more microprocessors 605 and connected system components (e.g., multiple connected chips). Alternatively, data processing system 600 is a system on a chip.

Data processing system 600 includes memory 610, which is coupled to microprocessor(s) 605. Memory 610 may be used for storing data, metadata, and programs for execution by the microprocessor(s) 605. For example, memory 610 may include one or more of the data stores 101 and/or may store modules described herein. Memory 610 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 610 may be internal or distributed memory. This memory may store instructions corresponding to engines/components detailed above.

Data processing system 600 includes network and port interfaces 615, such as a port, connector for a dock, or a connector for a USB interface, FireWire, Thunderbolt, Ethernet, Fibre Channel, etc. to connect the system 600 with another device, external component, or a network. Exemplary network and port interfaces 615 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 600 with another device, external component, or a network and receive stored instructions, data, tokens, etc.

Data processing system 600 also includes display controller and display device 620 and one or more input or output ("I/O") devices and interfaces 625. Display controller and display device 620 provides a visual user interface for the user. I/O devices 625 allow a user to provide input to, receive output from, and otherwise transfer data to and from the system. I/O devices 625 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 6.

Data processing system 600 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 600 may be a network computer, server, or an embedded processing device within another device or consumer electronic product. As used herein, the terms computer, device, system, processing system, processing device, and "apparatus comprising a processing device" may be used interchangeably with data processing system 600 and include the above-listed exemplary embodiments.

Additional components, not shown, may also be part of data processing system 600, and, in certain embodiments, fewer components than that shown in FIG. 6 may also be used in data processing system 600. It will be apparent from this description that aspects of the inventions may be embodied, at least in part, in software. That is, the computer-implemented method(s) detailed above may be carried out in a computer system or other data processing system 600 in response to its processor or processing system 605 executing sequences of instructions contained in a memory, such as memory 610 or other non-transitory machine-readable storage medium. The software may further be transmitted or received over a network (not shown) via network interface device 615. In various embodiments, hardwired circuitry may be used in combination with the software instructions to implement the present embodiments. Thus, the techniques are not limited to any specific combination of hardware circuitry and software, or to any particular source for the instructions executed by data processing system 600.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
    receiving, by a social networking system, a search query from a user device;
    generating a search result comprising an entity result card by:
        determining an entity of interest based on the search query;
        identifying a plurality of images associated with the entity of interest and shared by one or more co-users of the social networking system with other users of the social networking system;
        determining an order for the plurality of images using a social graph of the social networking system comprising connections among a user of the user device and the entity of interest;
        identifying one or more comments that reference the entity of interest by the one or more co-users or the social networking system and shared with other users of the social networking system; and
        identifying a word or phrase occurring more than a threshold number within the one or more comments; and
    providing the entity result card for display on the user device within a graphical user interface of the social networking system, the entity result card comprising the plurality of images arranged according to the determined order and a snippet comprising the identified word or phrase occurring more than a threshold number within the one or more comments.

2. The computer-implemented method of claim 1, further comprising limiting the search query by a place type based on receiving an indication from, the user device of a user selection of a search constraint.

3. The computer-implemented method of claim 1, further comprising providing, via the graphical user interface of the social networking system, a plurality of selectable search constraints for applying one or more constraints to the search query, the one or more constraints comprising one or more of: topic type, location, social interaction, or visited by.

4. The computer-implemented method of claim 1, wherein the snippet comprises a portion of a larger posting that highlights the identified word or phrase occurring more than a threshold number within the one or more comments.

5. The computer-implemented method of claim 1, wherein determining the order for the plurality of images using the social graph of the social networking system comprises determining a weight or score for one or more edges connecting a first node representing the user of the user device to a second node representing a profile associated with the entity of interest.

6. The computer-implemented method of claim 1, wherein determining the order for plurality of images comprises giving an image from the plurality of images shared by a co-user of the social networking system connected to the user within the social graph a higher priority and a position within the entity result card before another image from the plurality of images shared by another co-user of the social networking system not connected to the user within the social graph.

7. The computer-implemented method of claim 1, wherein:
one or more of the plurality of images depict an item for which the entity of interest is know for among a plurality of users of the social networking system; and
the snippet comprising the identified word or phrase occurring more than the threshold number within the one or more comments indicates the identified word or phrase as describing the item for which the entity of interest is known for among the plurality of users of the social networking system.

8. A non-transitory computer-readable medium storing instructions that, when executed by one or more processors, cause a computer system to:
receive a search query received from a user device;
generate a search result comprising an entity result card by:
determining an entity of interest based on the search query;
identifying a plurality of images associated with the entity of interest and shared by one or more co-users of a social networking system with other users of the social networking system;
determining an order for the plurality of images using a social graph of the social networking system comprising connections among a user of the user device and the entity of interest;
identifying one or more comments that reference the entity of interest by the one or more co-users of: the social networking system and shared with other users of the social networking system; and
identifying a word or phrase occurring more than a threshold number within the one or more comments; and
provide the entity result card for display on the user device within a graphical user interface of the social networking system, the entity result card comprising the plurality of images arranged according to the determined order and a snippet comprising the identified word or phrase occurring more than a threshold number within the one or more comments.

9. The non-transitory computer-readable medium of claim 8, wherein the instructions, when executed by the one or more processors, cause the computer system to limit the search query by a location based on receiving an indication from the user device of a user selection of a search constraint.

10. The non-transitory computer-readable medium of claim 8, further comprising instructions that, when executed by the one or more processors, cause the computer system to provide, via the graphical user interface of the social networking system, a plurality of selectable search constraints for applying one or more constraints to the search query, the one or more constraints comprising one or more of: topic type, location, social interaction, or visited by.

11. The non-transitory computer-readable medium of claim 8, wherein the snippet comprises a portion of a larger posting that highlight the identified word or phrase occurring more than a threshold number within the one or more components.

12. The non-transitory computer-readable medium of claim 8, further comprising instructions that, when executed by the one or more processors, cause the computer system to determine the order for the plurality of images using the social graph of the social networking system by determining a weight or score for one or more edges connecting a first node representing the user of the user device to a second node representing a profile associated with the entity of interest.

13. The non-transitory computer-readable medium of claim 8, further comprising instructions that, when executed by the one or more processors, cause the computer system to determine the order for the plurality of images by giving an image from the plurality of images shared by a co-user of the social networking system connected to the user within the social graph a higher priority and a position within the entity result card before another image from the plurality of images shared by another co-user of the social networking system not connected to the user within the social graph.

14. The non-transitory computer-readable medium of claim 8, wherein:
one or more of the plurality of images depict an item for which the entity of interest is known for among a plurality of users of social networking system; and
the snippet comprising the identified word or phrase occurring more than the threshold number within the one or more comments indicates the identified word or phrase as describing the item for which the entity of interest is known for among the plurality of users of the social networking system.

15. A system comprising:
at least one processor;
at least one non-transitory computer memory comprising instructions that, when executed by the at least one processor, cause the system to:
receive a search query received from a user device;
generate a search result comprising an entity result card by:
determining an entity of interest based on the search query;
identifying a plurality of images associated with the entity of interest and shared by one or more co-users of a social networking system with other users of the social networking system;
determining an order for the plurality of images using a social graph of the social networking system comprising connections among a user of the user device and the entity of interest;
identifying one or more comments that reference the entity of interest by the one or more co-users of the social networking system and shared with other users of the social networking system; and
identifying a word or phrase occurring more than a threshold number within the one or more comments; and
provide the entity result card for display on the user device within a graphical user interface of the social networking system, the entity result card comprising the plurality of images arranged according to the determined order and a snippet comprising the identified word or phrase occurring more than a threshold number within the one or more comments.

16. The system of claim 15, further comprising instructions that, when executed by the at least one processor, cause the system to limit the search query by a time period based on receiving an indication from the user device of a user selection of a search constraint.

17. The system of claim 15, further comprising instructions that, when executed by the at least one processor cause, the system to provide, via the graphical user interface of the social networking system, a plurality of selectable search constraints for applying one or more constraints to the search query, the one or more constraints comprising one or more of topic type, location, social interaction, or visited by.

18. The system of claim 15, wherein the snippet comprises a portion of a larger posting that highlights the identified word or phrase occurring more than a threshold number within the one or more comments.

19. The system of claim 15, further Coin icing instructions that, when executed by the at least one processor, cause the system to determine the order for the plurality of images using the social graph of the social networking system by determining a weight or score for one or more edges connecting a first node representing the use of the user device to a second node representing a profile associated with the entity of interest.

20. The system of claim 19, further comprising instructions that when executed by the at least one processor, cause the system to determine the order for the plurality or images by giving an image from the plurality of images shared by a co-user of the social networking system connected to the user within the social graph a higher priority and a position within the entity result card before another image from the plurality of images shared by another co-user of the social networking system not connected to the user within the social graph.

* * * * *